United States Patent
Lee et al.

(10) Patent No.: US 12,100,837 B2
(45) Date of Patent: Sep. 24, 2024

(54) METHOD OF PREPARING POSITIVE ELECTRODE ACTIVE MATERIAL PRECURSOR AND POSITIVE ELECTRODE ACTIVE MATERIAL PRECURSOR

(71) Applicant: LG Chem, Ltd., Seoul (KR)

(72) Inventors: Eung Ju Lee, Daejeon (KR); Ji Hun Jung, Daejeon (KR); Jun Won Lee, Daejeon (KR)

(73) Assignee: LG Chem, Ltd., Seoul (KR)

(*) Notice: Subject to any disclaimer, the term of this patent is extended or adjusted under 35 U.S.C. 154(b) by 667 days.

(21) Appl. No.: 17/428,779

(22) PCT Filed: Oct. 23, 2020

(86) PCT No.: PCT/KR2020/014576
§ 371 (c)(1),
(2) Date: Aug. 5, 2021

(87) PCT Pub. No.: WO2021/080374
PCT Pub. Date: Apr. 29, 2021

(65) Prior Publication Data
US 2022/0006084 A1    Jan. 6, 2022

(30) Foreign Application Priority Data
Oct. 23, 2019  (KR) ................. 10-2019-0132478

(51) Int. Cl.
*H01M 4/525*    (2010.01)
*H01M 4/04*     (2006.01)
(Continued)

(52) U.S. Cl.
CPC ......... *H01M 4/525* (2013.01); *H01M 4/0497* (2013.01); *H01M 4/505* (2013.01);
(Continued)

(58) Field of Classification Search
CPC ... C01G 53/006; C01G 53/50; C01P 2002/60; C01P 2004/04; C01P 2004/50;
(Continued)

(56) References Cited

U.S. PATENT DOCUMENTS

| | | |
|---|---|---|
| 2010/0015514 A1 | 1/2010 | Miyagi et al. |
| 2012/0015231 A1 | 1/2012 | Takamori et al. |

(Continued)

FOREIGN PATENT DOCUMENTS

| | | |
|---|---|---|
| CN | 102362377 A | 2/2012 |
| CN | 106654222 A | 5/2017 |

(Continued)

OTHER PUBLICATIONS

International Search Report for Application No. PCT/KR2020/014576, mailing Feb. 1, 2021, 2 pages.
(Continued)

*Primary Examiner* — Lingwen R Zeng
(74) *Attorney, Agent, or Firm* — Lerner David LLP (57) ABSTRACT

A method of preparing a positive electrode active material precursor includes: providing a transition metal-containing solution including nickel, cobalt, and manganese; and introducing the transition metal-containing solution into a reactor, adding a basic aqueous solution and an ammonium cation-containing complex-forming agent, and performing a co-precipitation reaction to prepare a transition metal hydroxide in the form of a secondary particle formed by agglomerating primary particles. The co-precipitation reaction is performed under conditions satisfying Expression 1 described in the specification, and a positive electrode active material precursor whose crystalline grain has a controlled aspect ratio. A positive electrode active material prepared using the positive electrode active material precursor, a positive electrode for a lithium secondary battery, which (Continued)

includes the positive electrode active material, and a lithium secondary battery are also provided.

12 Claims, 3 Drawing Sheets

(51) Int. Cl.
- *H01M 4/505* (2010.01)
- *H01M 10/0525* (2010.01)
- *C01G 53/00* (2006.01)
- *H01M 4/02* (2006.01)

(52) U.S. Cl.
CPC ...... *H01M 10/0525* (2013.01); *C01G 53/006* (2013.01); *C01G 53/50* (2013.01); *C01P 2002/60* (2013.01); *C01P 2004/04* (2013.01); *C01P 2004/50* (2013.01); *C01P 2004/54* (2013.01); *H01M 2004/028* (2013.01); *Y02E 60/10* (2013.01)

(58) Field of Classification Search
CPC ........... C01P 2004/54; H01M 10/0525; H01M 2004/028; H01M 4/0497; H01M 4/505; H01M 4/525; Y02E 60/10
See application file for complete search history.

(56) References Cited

U.S. PATENT DOCUMENTS

| | | |
|---|---|---|
| 2013/0022861 A1 | 1/2013 | Miyagi et al. |
| 2013/0168600 A1 | 7/2013 | Niittykoski et al. |
| 2015/0243936 A1 | 8/2015 | Miyagi et al. |
| 2016/0268594 A1 | 9/2016 | Kim et al. |
| 2016/0308196 A1 | 10/2016 | Matsubara et al. |
| 2017/0040593 A1 | 2/2017 | Miyagi et al. |
| 2017/0155144 A1 | 6/2017 | Yamauchi et al. |
| 2017/0222221 A1 | 8/2017 | Park et al. |
| 2017/0324090 A1 | 11/2017 | Ryoshi et al. |
| 2018/0254511 A1 | 9/2018 | Park et al. |
| 2019/0020022 A1 | 1/2019 | Jeong et al. |
| 2019/0074513 A1 * | 3/2019 | Ham ................ H01M 10/0525 |
| 2019/0252672 A1 | 8/2019 | Miyagi et al. |
| 2019/0260024 A1 | 8/2019 | Nakamura et al. |
| 2019/0348675 A1 | 11/2019 | Yamauchi et al. |
| 2020/0161653 A1 | 5/2020 | Ryoshi et al. |
| 2021/0066707 A1 | 3/2021 | Miyagi et al. |
| 2021/0184213 A1 | 6/2021 | Song et al. |

FOREIGN PATENT DOCUMENTS

| | | |
|---|---|---|
| CN | 106660826 A | 5/2017 |
| CN | 107108264 A | 8/2017 |
| CN | 108140819 A | 6/2018 |
| CN | 108539193 A | 9/2018 |
| CN | 108585065 A | 9/2018 |
| CN | 109428076 A | 3/2019 |
| CN | 109786736 A | 5/2019 |
| JP | 2014506220 A | 3/2014 |
| JP | 2014084514 A | 5/2014 |
| JP | 2015164123 A | 9/2015 |
| JP | 2017130395 A | 7/2017 |
| JP | 2018536972 A | 12/2018 |
| KR | 100815583 B1 | 3/2008 |
| KR | 101577179 B1 | 12/2015 |
| KR | 20160040576 A | 4/2016 |
| KR | 20160043862 A | 4/2016 |
| KR | 20160049995 A | 5/2016 |
| KR | 20160075404 A | 6/2016 |
| KR | 20170076723 A | 7/2017 |
| KR | 20170094002 A | 8/2017 |
| KR | 20190035716 A | 4/2019 |
| WO | 2016204563 A1 | 12/2016 |
| WO | 2017150945 A1 | 9/2017 |
| WO | 2018020845 A1 | 2/2018 |
| WO | 2019124767 A1 | 6/2019 |

OTHER PUBLICATIONS

Extended European Search Report including Written Opinion for Application No. 20880127.4 dated Mar. 15, 2022, pp. 1-7.

Search Report dated Oct. 10, 2022 from the Office Action for Chinese Application No. 202080012321.7 issued Oct. 17, 2022, 3 pages.

* cited by examiner

METHOD OF PREPARING POSITIVE ELECTRODE ACTIVE MATERIAL PRECURSOR AND POSITIVE ELECTRODE ACTIVE MATERIAL PRECURSOR

CROSS-REFERENCE TO RELATED APPLICATION

The present application is a national stage entry under 35 U.S.C. § 371 of International Application No. PCT/KR2020/014576 filed on Oct. 23, 2020, which claims priority to Korean Patent Application No. 10-2019-0132478, filed on Oct. 23, 2019, the disclosures of which are incorporated herein by reference in their entirety.

TECHNICAL FIELD

The present invention relates to a method of preparing a positive electrode active material precursor for a lithium secondary battery, a positive electrode active material precursor whose crystalline grain has a controlled aspect ratio, a positive electrode active material prepared using the positive electrode active material precursor, a positive electrode including the positive electrode active material, and a lithium secondary battery.

BACKGROUND ART

As the technology for mobile devices is developed and the demand for mobile devices increases, the demand for secondary batteries as an energy source is rapidly increasing. Among secondary batteries, lithium secondary batteries having high energy density, a high voltage, a long cycle lifespan, and a low self-discharge rate have been commercialized and widely used.

Lithium-transition metal oxides have been used as a positive electrode active material for a lithium secondary battery, and among lithium-transition metal oxides, $LiCoO_2$, which is a lithium-cobalt oxide having a high operating voltage and excellent capacity characteristics, has been mainly used. However, since $LiCoO_2$ not only has very poor thermal properties due to the destabilization of its crystal structure resulting from lithium deintercalation but also is expensive, it has a limitation in mass use as a power source in the electric vehicle field and the like.

As a material for replacing $LiCoO_2$, lithium-manganese composite metal oxides ($LiMnO_2$, $LiMn_2O_4$, etc.), lithium-iron phosphate oxides ($LiFePO_4$, etc.), lithium-nickel composite metal oxides ($LiNiO_2$, etc.), and the like have been developed. Among them, lithium-nickel composite metal oxides, which have a high reversible capacity of about 200 mAh/g and thus facilitate the implementation of large-capacity batteries, have been actively researched and developed. However, $LiNiO_2$ has inferior thermal stability to $LiCoO_2$ and causes a battery to fracture and ignite because the positive electrode active material itself is decomposed when an internal short circuit occurs in a charged state due to pressure applied from the outside. Accordingly, as a method for improving the low thermal stability of $LiNiO_2$ while maintaining the excellent reversible capacity thereof, $LiNi_{1-\alpha}Co_\alpha O_2$ ($\alpha$=0.1 to 0.3), in which a part of the nickel is substituted with cobalt, or lithium-nickel-cobalt metal oxides, in which a part of the nickel is substituted with Mn, Co, or Al, have been developed.

In order to prepare a positive electrode active material having desired electrochemical performance, it is important to accurately control a positive electrode active material precursor to have a desired shape.

The positive electrode active material precursor is typically prepared in the form of a spherical secondary particle formed by agglomerating dozens to hundreds of primary particles. According to the orientation of the primary particles of the positive electrode active material precursor, the shape (aspect ratio) of the primary particles, or the like, physical properties, such as the mobility of lithium ions of a positive electrode active material, the impregnability of an electrolytic solution, and the like, are changed. Accordingly, research has been attempted on analyzing the shape (aspect ratio, etc.) or orientation of the primary particles of the positive electrode active material precursor through a scanning electron microscope (SEM) or a transmission electron microscope (TEM) and improving the performance of a positive electrode active material using the analysis result.

However, in the case of TEM analysis, information about only a part, not the entirety, of the particles can be obtained, and thus it is difficult to indicate the characteristics of the entire positive electrode active material precursor particles. Also, since the physical properties of the positive electrode active material precursor vary depending on the structure of crystalline grains as well as the shape or orientation of the primary particles, even when the shape or orientation of the primary particles is similar, different physical properties may be exhibited.

Therefore, there is a need for the development of a positive electrode active material precursor whose crystalline grain has a controlled structure to develop a positive electrode active material having excellent properties.

PRIOR-ART DOCUMENTS

Patent Documents (Patent Document 1) Korean Registered Patent No. 1577179

DISCLOSURE

Technical Problem

The present invention is directed to providing a method of preparing a positive electrode active material precursor, which is capable of easily controlling the aspect ratio of a crystalline grain.

The present invention is also directed to providing a positive electrode active material precursor whose crystalline grain has a specifically controlled aspect ratio.

The present invention is also directed to providing a positive electrode active material prepared using the above-described positive electrode active material precursor.

The present invention is also directed to providing a positive electrode for a lithium secondary battery, which includes the above-described positive electrode active material, and a lithium secondary battery.

Technical Solution

One aspect of the present invention provides a method of preparing a positive electrode active material precursor, which includes: providing a transition metal-containing solution including nickel, cobalt, and manganese; and introducing the transition metal-containing solution into a reactor, adding a basic aqueous solution and an ammonium cation-containing complex-forming agent, and performing a co-precipitation reaction to prepare a transition metal hydroxide in the form of a secondary particle formed by agglomerating primary particles, wherein the co-precipitation reaction is performed under conditions satisfying the following Expression 1.

$$25 < 1.8 \times X + 0.2 \times Y + 20 \times Z < 30 \quad \text{[Expression 1]}$$

In Expression 1,

X is a ratio of the number of moles of ammonia included in the ammonium cation-containing complex-forming agent to the total number of moles of transition metals included in the transition metal-containing solution, Y is a value of a temperature (° C.) of the co-precipitation reaction, and Z is a ratio of the number of moles of nickel to the total number of moles of transition metals included in the transition metal-containing solution.

Another aspect of the present invention provides a positive electrode active material precursor, which includes a transition metal hydroxide in the form of a secondary particle formed by agglomerating primary particles, wherein an aspect ratio of a crystalline grain of the positive electrode active material precursor, which is a ratio (a/c) of the length (a) of the major axis to the length (c) of the minor axis, is 1.5 to 6.0 as measured by least squares approximation after applying the full width at half maximum of all of the peaks exhibited in X-ray diffraction (XRD) data obtained by XRD analysis for the positive electrode active material precursor to the following Expression 3.

$$d_{(hkl)} = \frac{K\lambda}{2\cos\theta \sqrt{\left\{a\,\cos(\tan^{-1}\left(\frac{a}{c}\tan(\frac{\sqrt{l^2}}{\sqrt{h^2+k^2}})\right)\right\}^2 + \left\{c\,\sin(\tan^{-1}\left(\frac{a}{c}\tan(\frac{\sqrt{l^2}}{\sqrt{h^2+k^2}})\right)\right\}^2}} \quad \text{[Expression 3]}$$

In Expression 3, $d_{(hkl)}$ is the full width at half maximum of a corresponding peak, h, k, and l are Miller indices for a crystallographic plane of a corresponding peak, K is a Scherrer constant, θ is a Bragg angle, λ is an X-ray wavelength, a is the length of the major axis of a crystalline grain, and c is the length of the minor axis of a crystalline grain.

Still another aspect of the present invention provides a positive electrode active material prepared using the above-described positive electrode active material precursor.

Yet another aspect of the present invention provides a positive electrode for a lithium secondary battery, which includes the above-described positive electrode active material.

Yet another aspect of the present invention provides a lithium secondary battery including the above-described positive electrode for a lithium secondary battery.

Advantageous Effects

According to a method of preparing a positive electrode active material precursor of the present invention, the aspect ratio of a crystalline grain can be easily controlled. Accordingly, a positive electrode active material precursor whose crystalline grain has a controlled structure, specifically, a controlled aspect ratio, can be provided.

Therefore, a positive electrode active material precursor satisfying desired electrochemical performance can be provided.

MODES OF THE INVENTION

Hereinafter, the present invention will be described in more detail.

Terms and words used in this specification and the claims should not be interpreted as limited to commonly used meanings or meanings in dictionaries and should be interpreted with meanings and concepts which are consistent with the technological scope of the present invention based on the principle that the inventors can appropriately define concepts of terms in order to describe the invention in the best way.

In the present invention, a "crystalline grain" means a single crystalline particle unit having a regular atomic arrangement.

The size of the crystalline grain is a value measured by analyzing X-ray diffraction (XRD) data, which is obtained by XRD analysis of positive electrode active material precursor powder, through Rietveld refinement, and the aspect ratio of the crystalline grain is a ratio (a/c) of the length (a) of the major axis of the crystalline grain to the length (c) of the minor axis of the crystalline grain, which is calculated by the Scherrer equation modified by applying the full width at half maximum of all of the peaks exhibited in the XRD data to ellipsoid modeling.

The size and aspect ratio of the crystalline grain may be obtained, specifically, by the following method.

First, a positive electrode active material precursor is analyzed through X-ray diffraction (XRD) to obtain XRD data. In this case, the XRD analysis may be performed under the following conditions using an Empyrean XRD instrument commercially available from Malvern Panalytical Ltd.

<XRD Analysis Conditions>

Light source: Cu-target, 45 kV, 40 mA output

Detector: GaliPIX3D

Sample preparation: About 5 g of sample fills a holder with a 2 cm diameter, and the holder is loaded in a rotation stage.

Measurement time: about 30 minutes

Measurement region: 2θ=15° to 85°

The size of the crystalline grain may be obtained using Malvern Panalytical's Highscore which is an XRD data refinement program, specifically, by fitting the full width at half maximum (FWHM) of all of the peaks exhibited in XRD data by the Caglioti equation.

The aspect ratio of the crystalline grain may be obtained from the length (c) of the minor axis and the length (a) of the major axis as measured by least squares approximation after applying the full width at half maximum of all of the peaks exhibited in XRD data obtained by XRD analysis for the positive electrode active material precursor to the following Expression 3.

$$d_{(hkl)} = \frac{K\lambda}{2\cos\theta\sqrt{\left\{a\cos(\tan^{-1}\left(\frac{a}{c}\tan(\frac{\sqrt{l^2}}{\sqrt{h^2+k^2}})\right)\right\}^2 + \left\{c\sin(\tan^{-1}\left(\frac{a}{c}\tan(\frac{\sqrt{l^2}}{\sqrt{h^2+k^2}})\right)\right\}^2}}$$ [Expression 3]

In Expression 3, $d_{(hkl)}$ is the full width at half maximum of a corresponding peak, h, k, and l are Miller indices for a crystallographic plane of a corresponding peak, K is a Scherrer constant, θ is a Bragg angle, λ is an X-ray wavelength, a is the length of the major axis of a crystalline grain, and c is the length of the minor axis of a crystalline grain.

In the present invention, a "primary particle" refers to the smallest particle unit that is distinguished as one lump when the cross section of the positive electrode active material precursor is observed by a scanning electron microscope (SEM), and may be composed of one crystalline grain or several crystalline grains. In the present invention, the average particle diameter of the primary particles may be determined by measuring the size of individual particles distinguished in SEM data for the cross section of positive electrode active material precursor particles.

Method of Preparing Positive Electrode Active Material Precursor

The present invention provides a method of preparing a positive electrode active material precursor, which allows the aspect ratio of a crystalline grain of a positive electrode active material precursor to be controlled.

The method of preparing a positive electrode active material precursor according to the present invention includes: providing a transition metal-containing solution including nickel, cobalt, and manganese; and introducing the transition metal-containing solution into a reactor, adding a basic aqueous solution and an ammonium cation-containing complex-forming agent, and performing a co-precipitation reaction to prepare a transition metal hydroxide in the form of a secondary particle formed by agglomerating primary particles, wherein the co-precipitation reaction is performed under conditions satisfying the following Expression 1.

$$25 < 1.8 \times X + 0.2 \times Y + 20 \times Z < 30 \quad \text{[Expression 1]}$$

In Expression 1,

X is a ratio of the number of moles of ammonia included in the ammonium cation-containing complex-forming agent to the total number of moles of transition metals included in the transition metal-containing solution, Y is a value of a temperature (° C.) of the co-precipitation reaction, and Z is a ratio of the number of moles of nickel to the total number of moles of transition metals included in the transition metal-containing solution.

According to the present invention, in the preparation of a positive electrode active material precursor, the aspect ratio of a crystalline grain of a positive electrode active material precursor may be controlled according to an input molar ratio of ammonia to a transition metal, a value of a temperature of a co-precipitation reaction, a ratio of the number of moles of nickel to the number of moles of transition metals included in a transition metal-containing solution, a pH condition of a co-precipitation reaction, and the like.

In this case, the aspect ratio of a crystalline grain of a positive electrode active material precursor is measured by analyzing the positive electrode active material precursor through XRD to obtain the full width at half maximum (FWHM) of all of the peaks according to individual crystalline directions and performing ellipsoid modeling based on the FWHM.

Each step of the method of preparing a positive electrode active material precursor will be described in detail.

First, a transition metal-containing solution including nickel, cobalt, and manganese is provided.

The transition metal-containing solution may, for example, include a nickel (Ni)-containing raw material, a cobalt (Co)-containing raw material, and a manganese (Mn)-containing raw material.

The nickel (Ni)-containing raw material may, for example, be a nickel-containing acetate, nitrate, sulfate, halide, sulfide, hydroxide, oxide, or oxyhydroxide and may specifically be $Ni(OH)_2$, NiO, NiOOH, $NiCO_3 \cdot 2Ni(OH)_2 \cdot 4H_2O$, $NiC_2O_2 \cdot 2H_2O$, $Ni(NO_3)_2 \cdot 6H_2O$, $NiSO_4$, $NiSO_4 \cdot 6H_2O$, nickel fatty acid salts, nickel halides, or a combination thereof, but the present invention is not limited thereto.

The cobalt (Co)-containing raw material may be a cobalt-containing acetate, nitrate, sulfate, halide, sulfide, hydroxide, oxide, or oxyhydroxide and may specifically be $Co(OH)_2$, CoOOH, $Co(OCOCH_3)_2 \cdot 4H_2O$, $Co(NO_3)_2 \cdot 6H_2O$, $CoSO_4$, $Co(SO_4)_2 \cdot 7H_2O$, or a combination thereof, but the present invention is not limited thereto.

The manganese (Mn)-containing raw material may, for example, be a manganese-containing acetate, nitrate, sulfate, halide, sulfide, hydroxide, oxide, oxyhydroxide, or a combination thereof and may specifically be a manganese oxide such as $Mn_2O_3$, $MnO_2$, $Mn_3O_4$, or the like, $MnCO_3$, $Mn(NO_3)_2$, $MnSO_4$, a manganese salt such as manganese acetate, manganese dicarboxylate, manganese citrate, or a manganese fatty acid salt, manganese oxyhydroxide, manganese chloride, or a combination thereof, but the present invention is not limited thereto.

The transition metal-containing solution may be prepared by adding a nickel (Ni)-containing raw material, a cobalt (Co)-containing raw material, and a manganese (Mn)-containing raw material to a solvent, specifically, water, or a solvent mixture of water and an organic solvent (e.g., alcohol, etc.) uniformly mixable with water or by mixing a nickel (Ni)-containing raw material aqueous solution, a cobalt (Co)-containing raw material aqueous solution, and a manganese Mn)-containing raw material aqueous solution.

According to the present invention, the transition metal-containing solution may include nickel at 80 mol % or more with respect to the total number of moles of transition metals.

Next, the transition metal-containing solution is introduced into a reactor, an ammonium cation-containing complex-forming agent and a basic aqueous solution are added, and a co-precipitation reaction is performed, thereby preparing a transition metal hydroxide in the form of a secondary particle formed by agglomerating primary particles.

The ammonium cation-containing complex-forming agent may be $NH_4OH$, $(NH_4)_2SO_4$, $NH_4NO_3$, $NH_4Cl$, $CH_3COONH_4$, $NH_4CO_3$, or the like, which may be used in combination of one or more thereof. In addition, the ammonium cation-containing complex-forming agent may be used in the form of an aqueous solution, and, in this case, water or a mixture of water and an organic solvent (specifically, alcohol, etc.) uniformly mixable with water may be used as a solvent.

The basic aqueous solution may include at least one selected from the group consisting of NaOH, KOH, and Ca(OH)$_2$, and water or a mixture of water and an organic solvent (specifically, alcohol, etc.) uniformly mixable with water may be used as a solvent. In this case, the basic aqueous solution may have a concentration of 2 M to 10 M, and preferably, 2.5 M to 3.5 M. When the concentration of the basic aqueous solution is 2 M to 10 M, precursor particles of a uniform size can be formed, the formation of precursor particles can proceed fast, and excellent yield can be achieved. The basic aqueous solution is added to adjust the pH of a reaction solution, and the amount of the basic aqueous solution may be adjusted to maintain pH 10 to pH 12, and preferably, pH 10.8 to pH 11.8, during a co-precipitation reaction.

According to the present invention, the co-precipitation reaction is performed under conditions satisfying the following Expression 1.

$$25 < 1.8 \times X + 0.2 \times Y + 20 \times Z < 30 \quad \text{[Expression 1]}$$

In Expression 1,
X is a ratio of the number of moles of ammonia included in the ammonium cation-containing complex-forming agent to the total number of moles of transition metals included in the transition metal-containing solution (i.e., input molar ratio of ammonia to transition metal),
Y is a value of a temperature (° C.) of the co-precipitation reaction, and
Z is a ratio of the number of moles of nickel to the total number of moles of transition metals included in the transition metal-containing solution.

The above-described Expression 1 is derived by the correlation of conditions such as an input molar ratio of ammonia to a transition metal, a value of a temperature of a co-precipitation reaction, and a ratio of the number of moles of nickel to the total number of moles of transition metals included in the transition metal-containing solution in the preparation of the transition metal hydroxide. Meanwhile, when a value of Expression 1 is 25 or less, a synthesis temperature is excessively low, or an ammonia input percentage is lowered, and thus synthesis yield or particle growth is degraded. When a value of Expression 1 is 30 or more, a precursor whose crystalline grain has a low aspect ratio is synthesized.

When the co-precipitation reaction is performed under conditions satisfying Expression 1, a positive electrode active material precursor whose crystalline grain has an appropriate aspect ratio level can be easily synthesized.

A value that satisfies Expression 1 is preferably 26 to 30, and most preferably, 28 to 30.

According to the present invention, the ammonium cation-containing complex-forming agent may be added so that a ratio of the number of moles of ammonia included in the ammonium cation-containing complex-forming agent to the total number of moles of transition metals included in the transition metal-containing solution (i.e., molar ratio of ammonia to transition metal) may be 0.2 to 2.0, preferably 0.2 to 1.0, and more preferably 0.3 to 0.8.

In this case, the number of moles of ammonia means the number of moles of an ammonium cation, and the number of moles of transition metals means the number of moles of the sum of nickel, cobalt, and manganese. When the ammonium cation-containing complex-forming agent and the transition metal-containing solution are mixed in the above-described molar ratio, a precursor whose crystalline grain has an appropriate aspect ratio level can be synthesized. For example, when the molar ratio of ammonia to the transition metal is less than 0.2, the density of a secondary particle may be degraded, and the specific surface area may excessively increase. On the other hand, when the molar ratio of ammonia to the transition metal is more than 2.0, the aspect ratio of a crystalline grain is lowered, and thus the primary particle may not exhibit orientation in the preparation of a positive electrode active material.

According to the present invention, a temperature of the co-precipitation reaction may be 40° C. to 60° C., and preferably, 40° C. or more and less than 60° C. When a transition metal hydroxide is prepared within the above-described temperature range, the co-precipitation reaction can be easily controlled, and productivity can be improved. When the co-precipitation reaction is performed below the above-described temperature range (at less than 40° C.), transition metal ions may be lost, leading to degraded productivity, and when the co-precipitation reaction is performed at more than 60° C., it may be difficult to control the size of primary particle due to the excessive growth of crystalline grains and to control the co-precipitation reaction due to the rapid evaporation of ammonia.

A pH condition of the co-precipitation reaction may be pH 10 to pH 12, and preferably, pH 10.8 to pH 11.8. When the co-precipitation reaction is performed in the above-described pH range, transition metal hydroxide particles having an appropriate particle size distribution and density can be prepared. On the other hand, when the co-precipitation reaction is performed at a pH of less than 10, transition metal ions may be lost, leading to degraded productivity, and when the co-precipitation reaction is performed at a pH of more than 12, a secondary particle may not grow.

According to the present invention, the aspect ratio of a crystalline grain of a positive electrode active material precursor prepared by the above-described method may be 1.5 to 6.0, and preferably, 3.0 to 6.0, as measured by analyzing the positive electrode active material precursor through XRD to obtain the full width at half maximum (FWHM) of all of the peaks according to individual crystalline directions and performing ellipsoid modeling based on the FWHM.

Meanwhile, the co-precipitation reaction may be performed under conditions further satisfying the following Expression 2.

$$12 \leq A + (0.02 \times Y) \leq 13 \quad \text{[Expression 2]}$$

In Expression 2, A represents a pH of the co-precipitation reaction, and Y represents a temperature (° C.) of the co-precipitation reaction.

The above-described Expression 2 is derived by the correlation of the optimal pH condition according to a temperature change in the formation of the precursor. For example, when the constant multiplied by the temperature inside a reactor is more than 0.02, even when the value thus calculated satisfies 12 to 13, transition metal ions may be eluted, leading to degraded productivity. On the other hand, when the constant multiplied by the temperature inside a reactor is less than 0.02, a precursor in the form of a secondary particle formed by agglomerating primary particles with a low aspect ratio may be synthesized, or a secondary particle may not grow.

When the co-precipitation reaction is performed under conditions satisfying Expression 2, the loss of transition metal ions can be reduced, and a positive electrode active material precursor having an appropriate aspect ratio level can be easily synthesized.

A value that satisfies Expression 2 is preferably 12 to 12.5 and most preferably close to 12.5.

Positive Electrode Active Material Precursor

In addition, the present invention provides a positive electrode active material precursor whose crystalline grain has a controlled aspect ratio so that desired electrochemical performance can be achieved by accurately identifying the aspect ratio of a crystalline grain of the positive electrode active material precursor through XRD analysis.

Specifically, the positive electrode active material precursor of the present invention includes a transition metal hydroxide in the form of a secondary particle formed by agglomerating primary particles, wherein an aspect ratio of a crystalline grain of the positive electrode active material precursor, which is a ratio (a/c) of the length (a) of the major axis to the length (c) of the minor axis, is 1.5 to 6.0 as measured by least squares approximation after applying the full width at half maximum of all of the peaks exhibited in X-ray diffraction (XRD) data obtained by XRD analysis for the positive electrode active material precursor to the following Expression 3.

$$d_{(hkl)} = \frac{K\lambda}{2\cos\theta\sqrt{\left\{a\cos(\tan^{-1}(\frac{a}{c}\tan(\frac{\sqrt{l^2}}{\sqrt{h^2+k^2}})))\right\}^2 + \left\{c\sin(\tan^{-1}(\frac{a}{c}\tan(\frac{\sqrt{l^2}}{\sqrt{h^2+k^2}})))\right\}^2}}$$ [Expression 3]

In Expression 3, $d_{(hkl)}$ is the full width at half maximum of a corresponding peak, h, k, and l are Miller indices for a crystallographic plane of a corresponding peak, K is a Scherrer constant, θ is a Bragg angle, λ is an X-ray wavelength, a is the length of the major axis of a crystalline grain, and c is the length of the minor axis of a crystalline grain.

When the aspect ratio of a crystalline grain of the positive electrode active material precursor satisfies the above-described range, the (001) plane of the crystalline grain of the positive electrode active material precursor can be oriented from the center to the surface of the secondary particle, and thus the crystalline grain of the primary particle of a positive electrode active material prepared using the precursor can be formed so that the (003) plane, in which lithium ions move, is regularly oriented from the center to the surface of the secondary particle. Also, when a battery with the positive electrode active material precursor is charged and discharged, lithium ions are easily diffused, and the destruction of a secondary particle due to expansion and contraction of a crystalline structure is suppressed, and thus structural stability can be improved.

For example, when the aspect ratio of a crystalline grain of the above-described positive electrode active material precursor does not satisfy the above-described range, the secondary particle of a precursor is formed with low density, or primary particles excessively grow, and thus the crystalline grain of a primary particle of the positive electrode active material prepared using the precursor may be formed to be randomly arranged without orientation. In this case, upon charging and discharging, lithium ions are not easily diffused, and the destruction of a secondary particle due to expansion and contraction of a crystalline structure occurs, and thus an improvement in structural stability may not be achieved.

The positive electrode active material precursor according to the present invention includes the transition metal hydroxide whose average composition is represented by the following Chemical Formula 1.

$Ni_xCo_yMn_zM1_w(OH)_2$ [Chemical Formula 1]

In Chemical Formula 1,

M1 is at least one selected from the group consisting of B, Al, Zr, Y, Mo, Cr, V, W, Ta, and Nb, 0.8≤x≤1.0, 0≤y≤0.33, 0≤z≤0.33, 0≤w≤0.15, and preferably, 0.8≤x≤1.0, 0≤y≤0.33, 0≤z≤0.33, 0≤w≤0.15, and x+y+z+w=1.

For example, the positive electrode active material precursor according to the present invention may have a uniform composition from the center to the surface of a particle, a core-shell structure in which the center and surface of a particle have different compositions, or a concentration gradient in which the composition of at least one of nickel, cobalt, and manganese is gradually changed from the center to the surface of a particle.

For example, when the positive electrode active material precursor has a core-shell structure in which the center and surface of particles have different compositions, the optimal composition can be set according to a position in the particle, and a positive electrode active material having improved electrochemical stability and improved thermal stability can be prepared using the precursor.

In addition, according to the present invention, the transition metal hydroxide may be in the form of a secondary particle formed by agglomerating primary particles. When the transition metal hydroxide is formed in the form of a secondary particle formed by agglomerating primary particles, high specific surface area and high rolling density can be achieved at the same time, and thus, when the transition metal hydroxide is applied, energy density per unit volume can be increased.

For example, the transition metal hydroxide may be in the form of a secondary particle formed by agglomerating primary particles whose crystalline grain has a size of 5 nm to 300 nm, and preferably, 10 nm to 150 nm. As the transition metal hydroxide has a large crystalline grain size within the above-described range, the surface area of the transition metal hydroxide may be reduced, and as the transition metal hydroxide has a smaller crystalline grain size within the above-described range, the surface area of the transition metal hydroxide may increase.

Positive Electrode Active Material

In addition, the present invention provides a positive electrode active material prepared using the above-described positive electrode active material precursor.

The positive electrode active material according to the present invention may be prepared by mixing the above-described positive electrode active material precursor with a lithium-containing raw material and firing the mixture.

In this case, the lithium-containing raw material is not particularly limited as long as it is a compound containing a lithium source, and preferably, at least one selected from the group consisting of lithium carbonate ($Li_2CO_3$), lithium hydroxide (LiOH), $LiNO_3$, $CH_3COOLi$, and $Li_2(COO)_2$ may be used.

Preferably, the positive electrode active material according to the present invention may be prepared by mixing the positive electrode active material precursor and the lithium-containing raw material in a molar ratio of 1:1.0 to 1:1.2 and firing the mixture at 600° C. to 1,000° C. for 5 to 40 hours.

When the mixing percentage of the lithium-containing raw material is below the above-described range, the capacity of the prepared positive electrode active material may be degraded, and when the mixing percentage of the lithium-containing raw material is above the above-described range, particles are sintered during the firing process, and thus it may be difficult to prepare a positive electrode active material, and capacity degradation and the separation of positive electrode active material particles after the firing may be caused.

In addition, when the firing is performed at less than 600° C., the high-temperature stability of a battery may be degraded due to raw materials remaining in particles due to an insufficient reaction, and structural stability may also be degraded due to a decrease in bulk density and crystallinity. On the other hand, when the firing is performed at more than 1,000° C., particles may not uniformly grow, and the number of particles, which can be included per unit area, may be reduced due to an excessive increase in particle size, leading to degradation of the volumetric capacity of a battery. Meanwhile, in consideration of control of the particle size of the prepared positive electrode active material, capacity, stability, and a reduction in lithium-containing by-products, the firing is more preferably performed at 650° C. to 850° C.

In addition, when the firing is performed for less than 5 hours, it may be difficult to obtain a positive electrode active material with high crystallinity due to a very short reaction time, and when the firing is performed for more than 40 hours, the particle size may excessively increase, and production efficiency may be degraded.

Positive Electrode

In addition, the present invention provides a positive electrode for a lithium secondary battery, which includes the above-described positive electrode active material.

Specifically, the positive electrode includes a positive electrode current collector and a positive electrode active material layer formed on at least one surface of the positive electrode current collector and including the above-described positive electrode active material.

The positive electrode current collector is not particularly limited as long as it does not cause a chemical change in the battery and has conductivity. For example, stainless steel, aluminum, nickel, titanium, calcined carbon, aluminum or stainless steel whose surface has been treated with carbon, nickel, titanium, silver, or the like, or the like may be used as the positive electrode current collector. In addition, the positive electrode current collector may typically have a thickness of 3 to 500 μm and have fine irregularities formed on the surface thereof to increase the adhesion of a positive electrode active material. Additionally, the positive electrode current collector may be used in any of various forms such as a film, a sheet, a foil, a net, a porous material, a foam, a non-woven fabric, and the like.

The positive electrode active material layer may include a conductive material and a binder in addition to the positive electrode active material.

In this case, the positive electrode active material may be included at 80 to 99 wt %, and more specifically, 85 to 98 wt %, with respect to the total weight of the positive electrode active material layer. Within the above-described range, excellent capacity characteristics can be exhibited.

The conductive material is used to impart conductivity to the electrode, and any conductive material that does not cause a chemical change in the battery and has electron conductivity may be used without particular limitation. Specific examples of the conductive material include: graphite such as natural graphite, artificial graphite, or the like; a carbon-based material such as carbon black, acetylene black, Ketjen black, channel black, furnace black, lamp black, thermal black, carbon fiber, or the like; a metal powder or metal fiber containing copper, nickel, aluminum, silver, or the like; a conductive whisker such as zinc oxide, potassium titanate, or the like; a conductive metal oxide such as titanium oxide or the like; and a conductive polymer such as a polyphenylene derivative or the like, which may be used alone or in combination of two or more thereof. The conductive material may be included at 1 to 30 wt % with respect to the total weight of the positive electrode active material layer.

The binder serves to improve cohesion between positive electrode active material particles and adhesion between the positive electrode active material and the current collector. Specific examples of the binder include polyvinylidene fluoride (PVDF), a vinylidene fluoride-hexafluoropropylene copolymer (PVDF-co-HFP), polyvinyl alcohol, polyacrylonitrile, carboxymethylcellulose (CMC), starch, hydroxypropylcellulose, regenerated cellulose, polyvinylpyrrolidone, tetrafluoroethylene, polyethylene, polypropylene, an ethylene-propylene-diene polymer (EPDM), a sulfonated EPDM, styrene butadiene rubber (SBR), fluoro-rubber, and various copolymers thereof, which may be used alone or in combination of two or more thereof. The binder may be included at 1 to 30 wt % with respect to the total weight of the positive electrode active material layer.

The positive electrode may be manufactured by a conventional method of manufacturing a positive electrode, except that the above-described positive electrode active material is used. Specifically, the positive electrode may be manufactured by applying a composition for forming a positive electrode active material layer, which is prepared by dissolving or dispersing the above-described positive electrode active material and, optionally, a binder and a conductive material in a solvent, onto a positive electrode current collector, followed by drying and roll pressing. In this case, the types and contents of the positive electrode active material, the binder, and the conductive material have been described above.

The solvent may be a solvent generally used in the art, and examples of the solvent include dimethyl sulfoxide (DMSO), isopropyl alcohol, N-methyl pyrrolidone (NMP), acetone, water, and the like, which may be used alone or in combination of two or more thereof. The solvent is used in an amount sufficient to dissolve or disperse the positive electrode active material, the conductive material, and the binder and to have a viscosity capable of achieving excellent thickness uniformity upon subsequent application for manufacturing the positive electrode in consideration of a thickness of an applied slurry and a manufacturing yield.

According to another method, the positive electrode may be manufactured by laminating, on a positive electrode current collector, a film obtained by casting the composition for forming a positive electrode active material layer on a separate support and removing it from the support.

Lithium Secondary Battery

In addition, the present invention provides an electrochemical device including the above-described positive electrode. The electrochemical device may specifically be a battery, a capacitor, or the like, and more specifically, a lithium secondary battery.

The lithium secondary battery specifically includes a positive electrode, a negative electrode disposed to face the positive electrode, a separator interposed between the positive electrode and the negative electrode, and an electrolyte. Since the positive electrode is the same as described above, the detailed description thereof will be omitted, and only the remaining components will be described in detail.

In addition, the lithium secondary battery may optionally further include: a battery container which accommodates an electrode assembly including the positive electrode, the negative electrode, and the separator; and a sealing member which seals the battery container.

In the lithium secondary battery, the negative electrode includes a negative electrode current collector and a negative electrode active material layer formed on the negative electrode current collector.

The negative electrode current collector is not particularly limited as long as it does not cause a chemical change in the battery and has high conductivity. For example, copper, stainless steel, aluminum, nickel, titanium, calcined carbon, copper or stainless steel whose surface has been treated with carbon, nickel, titanium, silver, or the like, an aluminum-cadmium alloy, or the like may be used as the negative electrode current collector. In addition, the negative electrode current collector may typically have a thickness of 3 µm to 500 µm and have fine irregularities formed on the surface thereof to increase the adhesion of a negative electrode active material like the positive electrode current collector. Additionally, the negative electrode current collector may be used in any of various forms such as a film, a sheet, a foil, a net, a porous material, a foam, a non-woven fabric, and the like.

The negative electrode active material layer includes a negative electrode active material and, optionally, a binder and a conductive material.

As the negative electrode active material, a compound that enables the reversible intercalation and deintercalation of lithium may be used. Specific examples of the negative electrode active material include: a carbonaceous material such as artificial graphite, natural graphite, graphitized carbon fiber, amorphous carbon, or the like; a metallic compound capable of alloying with lithium, such as Si, Al, Sn, Pb, Zn, Bi, In, Mg, Ga, Cd, a Si alloy, a Sn alloy, an Al alloy, or the like; a metal oxide capable of doping and dedoping lithium, such as $SiO_\beta$ ($0<\beta<2$), $SnO_2$, vanadium oxide, or lithium vanadium oxide; and a composite including the metallic compound and the carbonaceous material, such as a Si—C composite or a Sn—C composite, which may be used alone or in combination of two or more thereof. In addition, a lithium metal thin film may be used as the negative electrode active material. Additionally, as a carbon material, both low-crystallinity carbon and high-crystallinity carbon may be used. Representative examples of the low-crystallinity carbon include soft carbon and hard carbon, and representative examples of the high-crystallinity carbon include amorphous, platy, flaky, spherical or fibrous natural graphite or artificial graphite, Kish graphite, pyrolytic carbon, mesophase pitch-based carbon fiber, meso-carbon microbeads, mesophase pitches, and high-temperature calcined carbon such as petroleum or coal tar pitch-derived cokes, and the like.

The negative electrode active material may be included in an amount of 80 parts by weight to 99 parts by weight with respect to the total weight (100 parts by weight) of the negative electrode active material layer.

The binder serves to assist bonding between the conductive material, the active material, and the current collector and is typically included in an amount of 0.1 parts by weight to 10 parts by weight with respect to the total weight (100 parts by weight) of the negative electrode active material layer. Examples of the binder include polyvinylidene fluoride (PVDF), polyvinyl alcohol, carboxymethylcellulose (CMC), starch, hydroxypropylcellulose, regenerated cellulose, polyvinylpyrrolidone, tetrafluoroethylene, polyethylene, polypropylene, an ethylene-propylene-diene polymer (EPDM), a sulfonated EPDM, styrene butadiene rubber, nitrile butadiene rubber, fluorine rubber, and various copolymers thereof.

The conductive material is a component for improving the conductivity of the negative electrode active material and may be included in an amount of 10 parts by weight or less, and preferably, 5 parts by weight or less with respect to the total weight (100 parts by weight) of the negative electrode active material layer. Such a conductive material is not particularly limited as long as it does not cause a chemical change in the battery and has conductivity. For example, graphite such as natural graphite, artificial graphite, or the like; carbon black such as acetylene black, Ketjen black, channel black, furnace black, lamp black, thermal black, or the like; a conductive fiber such as a carbon fiber, a metal fiber, or the like; a metal powder containing carbon fluoride, aluminum, nickel, or the like; a conductive whisker such as zinc oxide, potassium titanate, or the like; a conductive metal oxide such as titanium oxide or the like; or a conductive material such as a polyphenylene derivative or the like may be used.

For example, the negative electrode active material layer may be formed by applying, onto a negative electrode current collector, a negative electrode mixture, which is prepared by dissolving or dispersing a negative electrode active material and, optionally, a binder and a conductive material in a solvent, and drying the same, or by laminating, on a negative electrode current collector, a film obtained by casting the negative electrode mixture on a separate support and removing it from the support.

Meanwhile, in the lithium secondary battery, the separator serves to separate the negative electrode and the positive electrode and provide a passage for lithium ion migration. As the separator, any separator that is typically used in a lithium secondary battery may be used without particular limitation, and in particular, a separator that exhibits low resistance to the migration of electrolyte ions and has an excellent electrolyte impregnation ability is preferred. Specifically, a porous polymer film, for example, a porous polymer film made of a polyolefin-based polymer such as an ethylene homopolymer, a propylene homopolymer, an ethylene/butene copolymer, an ethylene/hexene copolymer, an ethylene/methacrylate copolymer, or the like or a stacked structure having two or more layers thereof, may be used. In addition, a typical porous non-woven fabric, for example, a non-woven fabric made of high-melting-point glass fiber, polyethylene terephthalate fiber, or the like may be used. Also, to ensure heat resistance or mechanical strength, a coated separator which includes a ceramic component or polymer material and is optionally in a single-layer or multi-layer structure may be used.

In addition, as the electrolyte used in the present invention, an organic liquid electrolyte, an inorganic liquid electrolyte, a solid polymer electrolyte, a gel-type polymer electrolyte, an inorganic solid electrolyte, a molten-type inorganic electrolyte, or the like, which is usable in the manufacture of the lithium secondary battery, may be used, but the present invention is not limited thereto.

Specifically, the electrolyte may include an organic solvent and a lithium salt.

As the organic solvent, any solvent that may function as a medium through which ions involved in an electrochemical reaction of the battery can migrate may be used without particular limitation. Specifically, the organic solvent may be: an ester-based solvent such as methyl acetate, ethyl acetate, γ-butyrolactone, ε-caprolactone, or the like; an ether-based solvent such as dibutyl ether, tetrahydrofuran, or the like; a ketone-based solvent such as cyclohexanone or the like; an aromatic hydrocarbon-based solvent such as benzene, fluorobenzene, or the like; a carbonate-based solvent such as dimethyl carbonate (DMC), diethyl carbonate (DEC), methyl ethyl carbonate (MEC), ethyl methyl carbonate (EMC), ethylene carbonate (EC), propylene carbonate (PC), or the like; an alcohol-based solvent such as ethyl alcohol, isopropyl alcohol, or the like; a nitrile such as R—CN (R is a C2-C20 hydrocarbon group with a linear, branched or cyclic structure and may include a double-bonded aromatic ring or an ether linkage) or the like; an amide such as dimethylformamide or the like; dioxolane such as 1,3-dioxolane or the like; or sulfolane. Among those listed above, the carbonate-based solvent is preferred, and a mixture of a cyclic carbonate-based compound with high ion conductivity and high permittivity (e.g., EC, PC, etc.) and a linear carbonate-based compound with low viscosity (e.g., EMC, DMC, DEC, etc.), which may increase the charging/discharging performance of the battery, is more preferred. In this case, when a mixture obtained by mixing the cyclic carbonate-based compound and the linear carbonate-based compound in a volume ratio of about 1:1 to about 1:9 is used, excellent electrolyte performance may be exhibited.

As the lithium salt, any compound that may provide lithium ions used in a lithium secondary battery may be used without particular limitation. Specifically, as the lithium salt, $LiPF_6$, $LiClO_4$, $LiAsF_6$, $LiBF_4$, $LiSbF_6$, $LiAlO_4$, $LiAlCl_4$, $LiCF_3SO_3$, $LiC_4F_9SO_3$, $LiN(C_2F_5SO_3)_2$, $LiN(C_2F_5SO_2)_2$, $LiN(CF_3SO_2)_2$, LiCl, LiI, $LiB(C_2O_4)_2$, or the like may be used. The lithium salt is preferably used at a concentration of 0.1 to 2.0 M. When the concentration of the lithium salt is within the above-described range, the electrolyte has appropriate levels of conductivity and viscosity, and thus excellent electrolyte performance can be exhibited, and lithium ions can effectively migrate.

In addition to the above-described electrolyte components, the electrolyte may further include at least one additive selected from a haloalkylene carbonate-based compound such as difluoroethylene carbonate and the like, pyridine, triethylphosphite, triethanolamine, cyclic ether, ethylenediamine, n-glyme, hexaphosphoric triamide, a nitrobenzene derivative, sulfur, a quinone imine dye, an N-substituted oxazolidinone, an N,N-substituted imidazolidine, an ethylene glycol dialkyl ether, an ammonium salt, pyrrole, 2-methoxyethanol, aluminum trichloride, and the like for the purpose of improving the lifetime characteristics of the battery, suppressing a reduction in battery capacity, improving the discharge capacity of the battery, or the like. In this case, the additive may be included in an amount of 0.1 to 5 parts by weight with respect to the total weight (100 parts by weight) of the electrolyte.

Since the lithium secondary battery including the positive electrode active material according to the present invention stably exhibits excellent discharge capacity, output characteristics, and lifetime characteristics as described above, it is useful in the field of portable devices such as mobile phones, notebook computers, digital cameras, and the like and electric vehicles such as hybrid electric vehicles (HEVs) and the like.

Accordingly, the present invention also provides a battery module including the lithium secondary battery as a unit cell and a battery pack including the battery module.

The battery module or battery pack may be used as a power source for one or more medium-to-large-sized devices selected from a power tool; electric vehicles (EVs), hybrid electric vehicles, and plug-in hybrid electric vehicles (PHEVs); and a system for storing electric power.

The type of the lithium secondary battery according to the present invention may be, but is not particularly limited to, a cylindrical type using a can, a prismatic type, a pouch type, a coin type, or the like The lithium secondary battery according to the present invention may be used not only in a battery cell used as a power source of a small device but also as a unit battery in medium-to-large-sized battery modules including a plurality of battery cells.

Hereinafter, the present invention will be described in detail with reference to embodiments. However, embodiments of the present invention may be modified into several different forms, and the scope of the present invention is not limited to the embodiments to be described below. The embodiments of the present invention are provided so that this disclosure will be thorough and complete, and will fully convey the concept of embodiments to those skilled in the art.

EXAMPLES

Example 1

$NiSO_4$, $CoSO_4$, and $MnSO_4$ were mixed in distilled water in an amount such that a molar ratio of nickel, cobalt, and manganese was 88:5:7 to prepare a transition metal-containing solution at a concentration of 2.4 M.

A vessel containing the transition metal-containing solution was connected to a 20 L reactor. In addition, a 7.96M NaOH solution and a 9% $NH_4OH$ aqueous solution were provided and each connected to the reactor.

4.5 L of deionized water was added to the 20 L reactor set at 53° C., the reactor was purged with nitrogen gas at a rate of 8 L/min to remove oxygen dissolved in water, and a non-oxidizing atmosphere was formed in the reactor. Then, 8 mL of the 25 wt % NaOH aqueous solution and 0.5 L of the 9 wt % $NH_4OH$ aqueous solution were added to the reactor to adjust the pH inside the reactor to pH 11.9.

Afterward, the transition metal-containing solution and the $NH_4OH$ aqueous solution were added to the reactor at 0.85 L/hr and 0.16 L/hr, respectively, so that a molar ratio of ammonia and the transition metals was 0.4, and a co-precipitation reaction was performed at a pH of 11.4 for 4,800 minutes while adjusting the addition amount of the NaOH aqueous solution, thereby preparing a positive electrode active material precursor. In this case, a value of Expression 1 according to the present invention was 28.92.

Example 2

A positive electrode active material precursor was prepared in the same manner as in Example 1 except that a transition metal-containing solution and an $NH_4OH$ aqueous solution were added to a reactor at 0.85 L/hr and 0.24 L/hr, respectively, so that a molar ratio of ammonia and the transition metals was 0.6, and a co-precipitation reaction was performed at a pH of 11.4 for 4,800 minutes while adjusting the addition amount of an NaOH aqueous solution. In this case, a value of Expression 1 according to the present invention was 29.28.

Comparative Example 1

A positive electrode active material precursor was prepared in the same manner as in Example 1 except that a co-precipitation reaction was performed at 60° C. In this case, a value of Expression 1 according to the present invention was 30.32.

Comparative Example 2

A positive electrode active material precursor was prepared in the same manner as in Example 1 except that a transition metal-containing solution and an $NH_4OH$ aqueous solution were added to a reactor at 0.85 L/hr and 0.48 L/hr, respectively, so that a molar ratio of ammonia and the transition metals was 1.2, and a co-precipitation reaction was performed at a pH of 11.4 for 4,800 minutes while adjusting the addition amount of an NaOH aqueous solution. In this case, a value of Expression 1 according to the present invention was 30.36.

Comparative Example 3

A positive electrode active material precursor was prepared in the same manner as in Example 1 except that $NiSO_4$, $CoSO_4$, and $MnSO_4$ were mixed in distilled water in an amount such that a molar ratio of nickel, cobalt, and manganese was 65:10:25 to prepare a transition metal-containing solution at a concentration of 2.4 M. In this case, a value of Expression 1 according to the present invention was 24.32.

Experimental Example 1: Confirmation of Aspect Ratio of Crystalline Grain and Primary Particle of Positive Electrode Active Material Precursor (1) Confirmation of Aspect Ratio of Crystalline Grain of Positive Electrode Active Material Precursor The positive electrode active material precursors prepared in Examples 1 and 2 and Comparative Examples 1 to 3 were analyzed through X-ray diffraction (XRD) (Empyrean, Malvern Panalytical Ltd.) to measure the aspect ratio of crystalline grains. In this case, XRD analysis conditions and a measurement method of the aspect ratio of crystalline grains have been described above. Measurement results are shown in Table 1 below.

(2) Confirmation of Aspect Ratio of Primary Particle of Positive Electrode Active Material Precursor The aspect ratio of the primary particles of the positive electrode active material precursors prepared in Examples 1 and 2 and Comparative Examples 1 to 3 was measured.

Specifically, each of the positive electrode active material precursors prepared in Examples 1 and 2 and Comparative Examples 1 to 3 was pressurized with a pressure of 2,000 kgf/cm² to break active material particles, the aspect ratio of the cross section of the broken particle was confirmed by a scanning electron microscope (SEM), and results thereof are shown in Table 1 below.

TABLE 1

|  | Aspect ratio (a/c) of crystalline grain | Aspect ratio of primary particle |
|---|---|---|
| Example 1 | 4.2198 | 4.95 |
| Example 2 | 3.8729 | 4.54 |
| Comparative Example 1 | 1.8948 | 4.25 |
| Comparative Example 2 | 1.3762 | 3.86 |
| Comparative Example 3 | 1.5900 | 4.12 |

Referring to Table 1, it can be seen that the aspect ratios of the primary particles of the positive electrode active material precursors prepared in Examples 1 and 2 and Comparative Examples 1 to 3 were similar despite different preparation conditions, whereas the aspect ratios of the crystalline grains of the positive electrode active material precursors were completely different according to preparation conditions.

Experimental Example 2: Confirmation of Orientation of Positive Electrode Active Material A positive electrode active material was prepared using each of the positive electrode active material precursors prepared in Examples 1 and 2 and Comparative Examples 1 to 3.

Specifically, each of the positive electrode active material precursors prepared in Examples 1 and 2 and Comparative Examples 1 to 3 and $LiOH·H_2O$ were mixed in a molar ratio of 1:1.05 and fired at 750° C. for 15 hours to prepare a positive electrode active material.

The positive electrode active material prepared by the above-described method was subjected to ion milling to break particles, and then the crystalline structure of the cross section of the particles broken by ion milling was confirmed by an SEM.

Figure 1:
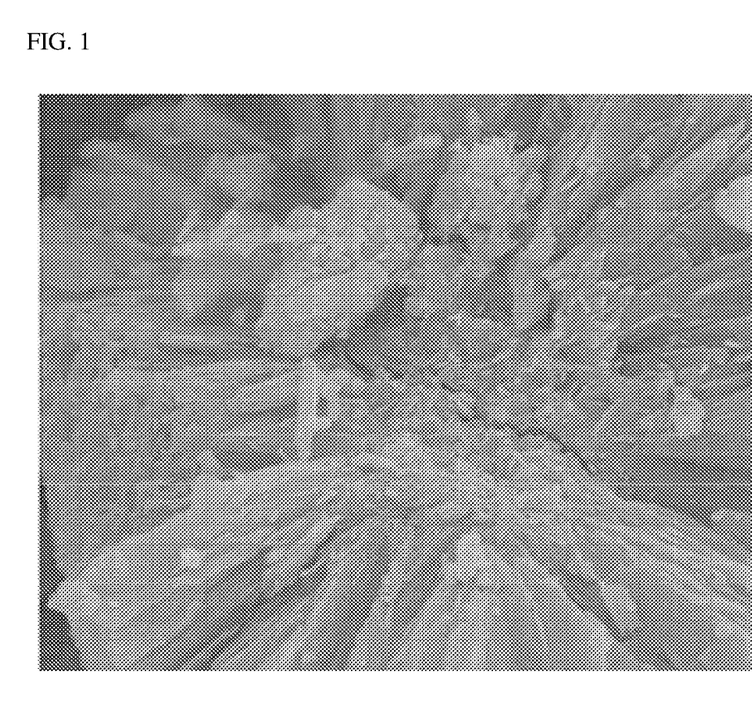
FIG. 1 is a scanning electron microscope (SEM) image of a cross section of a positive electrode active material prepared using a positive electrode active material precursor according to Example 1.
Figure 2:
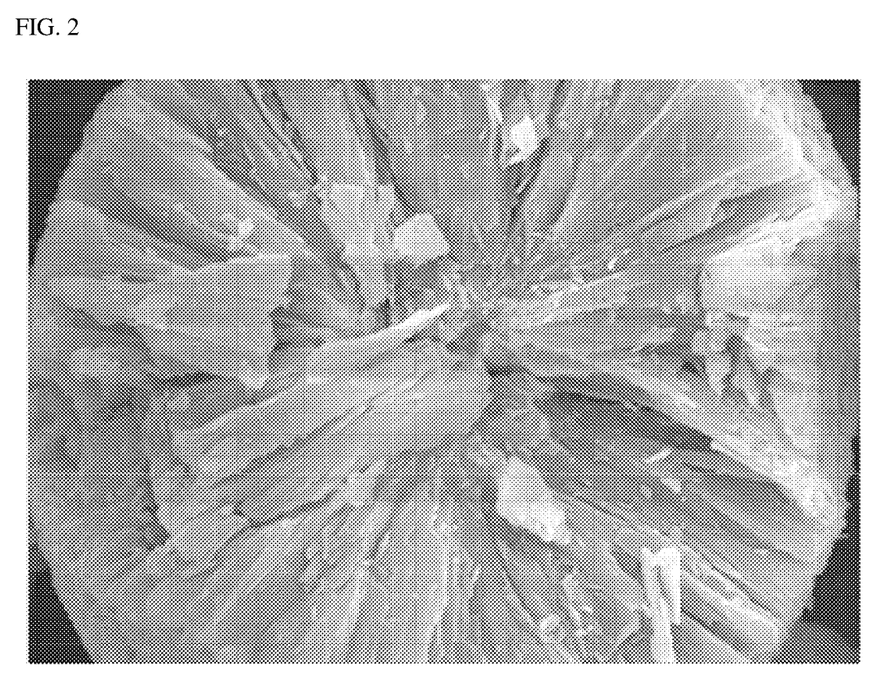
FIG. 2 is an SEM image of a cross section of a positive electrode active material prepared using a positive electrode active material precursor according to Example 2.
Figure 3:
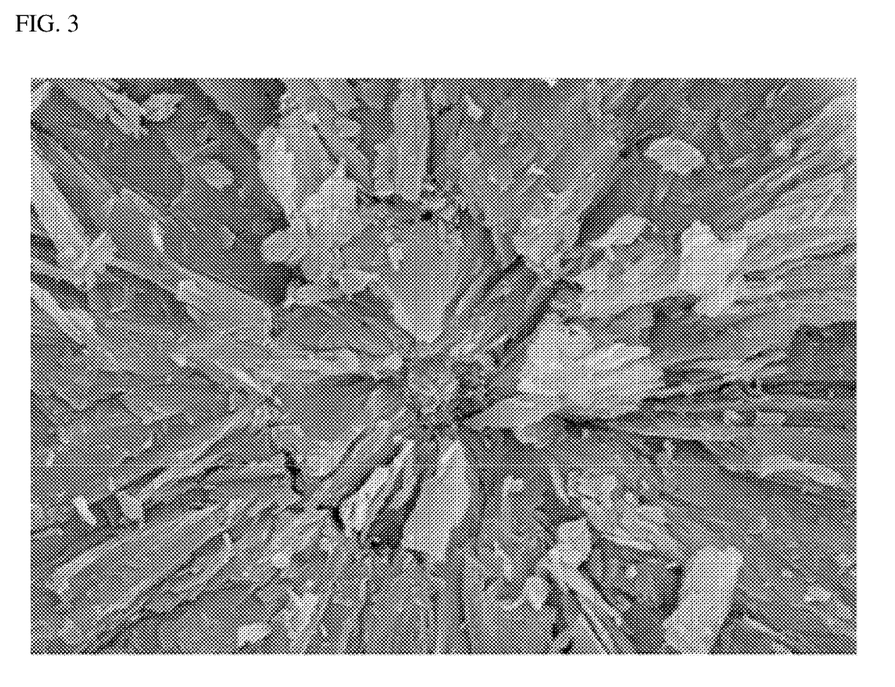
FIG. 3 is an SEM image of a cross section of a positive electrode active material prepared using a positive electrode active material precursor according to Comparative Example 1.
Figure 4:
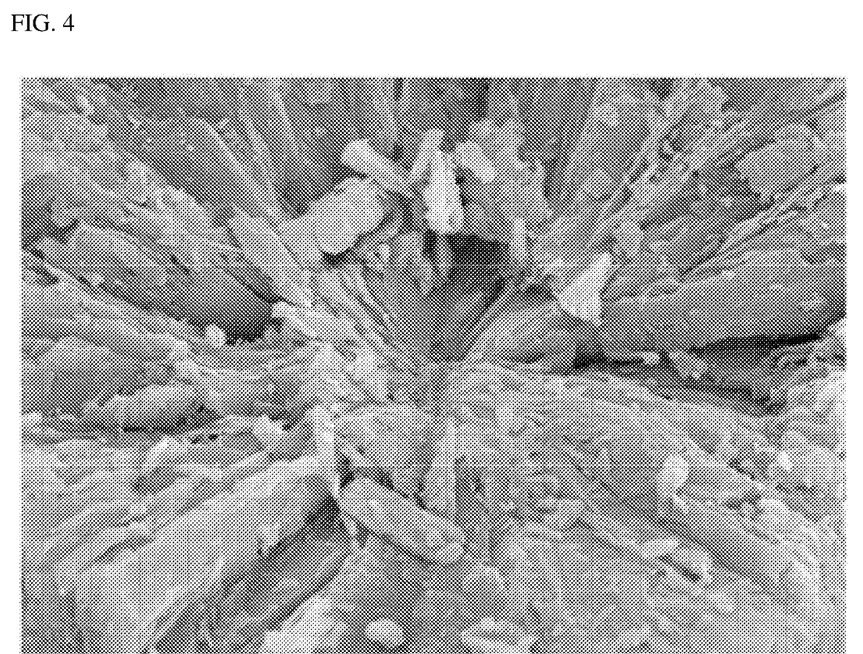
FIG. 4 is an SEM image of a cross section of a positive electrode active material prepared using a positive electrode active material precursor according to Comparative Example 2.
Figure 5:
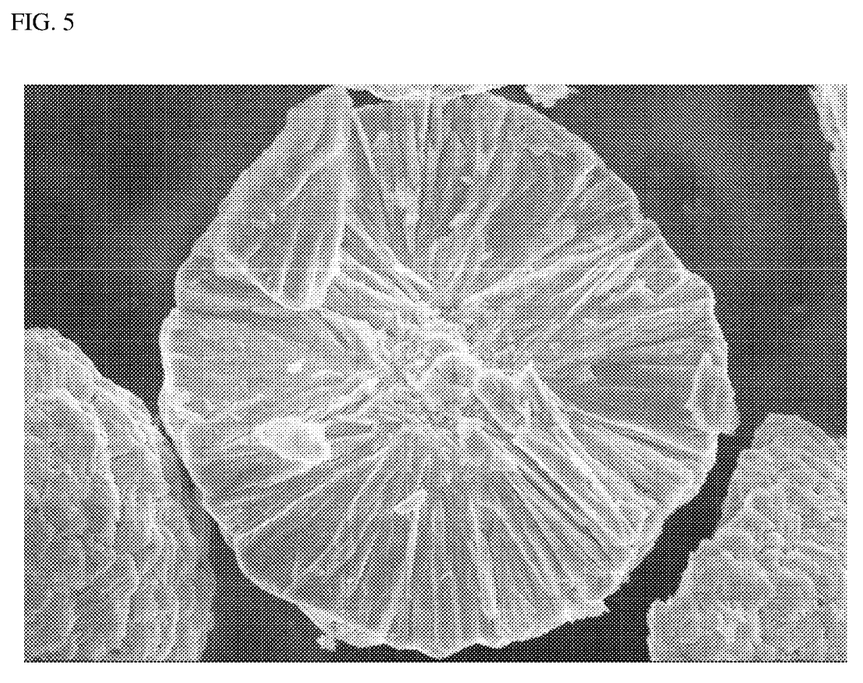
FIG. 5 is an SEM image of a cross section of a positive electrode active material prepared using a positive electrode active material precursor according to Comparative Example 3.

In this regard, FIGS. 1 and 2 are SEM images of the cross section of positive electrode active materials prepared according to Examples 1 and 2, respectively, and FIGS. 3 to 5 SEM images of the cross section of positive electrode active materials prepared according to Comparative Examples 1 to 3, respectively.

As shown in FIGS. 1 and 2, in the case of the positive electrode active materials prepared according to Examples 1 and 2, it can be seen that the (003) plane of the crystalline grain is oriented from the center to the surface of the secondary particle. This is because the (001) plane of the crystalline grain of the positive electrode active material precursor is oriented from the center to the surface of the secondary particle. On the other hand, as shown in FIGS. 3 to 5, in the case of the positive electrode active materials prepared according to Comparative Examples 1 to 3, it can be seen that a positive electrode active material precursor whose crystalline grain has a low aspect ratio is synthesized, or synthesis yield or particle growth is degraded, resulting in no specific orientation.

Experimental Example 3

A lithium secondary battery was manufactured using each of the positive electrode active materials of Examples 1 and 2 and Comparative Examples 1 to 3, which were prepared in Experimental Example 2, and the capacity characteristics thereof were evaluated.

Specifically, each of the positive electrode active materials of Examples 1 and 2 and Comparative Examples 1 to 3, carbon black as a conductive material, and polyvinylidene fluoride as a binder were mixed in a weight ratio of 97.5:1:1.5 in a N-methyl pyrrolidone solvent to prepare a positive electrode slurry. The positive electrode slurry was applied onto one surface of an aluminum current collector, dried at 130° C., and roll-pressed to manufacture a positive electrode.

Meanwhile, carbon black as a negative electrode active material and polyvinylidene fluoride as a binder were mixed in a weight ratio of 97.5:2.5, and the resulting mixture was added to an N-methyl pyrrolidone solvent to prepare a negative electrode active material slurry. The slurry was applied onto a 16.5 μm-thick copper foil, dried, and roll-pressed to manufacture a negative electrode.

A porous polyethylene separator was interposed between the manufactured positive electrode and negative electrode to manufacture an electrode assembly, then the electrode assembly was placed in a battery case, an electrolyte was injected into the case, thereby manufacturing a lithium secondary battery. In this case, as the electrolyte, an electrolyte prepared by dissolving 1M $LiPF_6$ in an organic solvent containing ethylene carbonate (EC), dimethyl carbonate (DMC), and ethyl methyl carbonate (EMC) mixed in a ratio of 3:4:3 was used to manufacture lithium secondary batteries according to Examples 1 and 2 and Comparative Examples 1 to 3.

The charging/discharging efficiency of the lithium secondary batteries according to Examples 1 and 2 and Comparative Examples 1 to 3 was evaluated, and results thereof are shown in Table 2 below.

Specifically, each of the lithium secondary batteries according to Examples 1 and 2 and Comparative Examples 1 to 3 was charged at 25° C. at a constant current of 0.2 C until 4.25 V was reached and discharged at a constant current of 0.2 C until 3.0 V was reached, and this process was set as one cycle. Charge capacity and discharge capacity at the first cycle were measured. In addition, the cycle was repeated 50 times, and then the lifetime characteristics of the lithium secondary batteries according to Examples 1 and 2 and Comparative Examples 1 to 3 at the $50^{th}$ cycle were measured. Results thereof are shown in Table 2 below.

TABLE 2

|  | Charge capacity (mAh/g) | Discharge capacity (mAh/g) | Lifetime at $50^{th}$ cycle (%) |
| --- | --- | --- | --- |
| Example 1 | 230.1 | 205.8 | 96.8 |
| Example 2 | 229.7 | 204.5 | 95.5 |
| Comparative Example 1 | 229.1 | 202.8 | 94.2 |
| Comparative Example 2 | 227.6 | 202.7 | 93.2 |
| Comparative Example 3 | 201.4 | 187.6 | 95.7 |

As shown in Tables 1 and 2, it can be seen that the lithium secondary batteries with the positive electrode active material precursors of Examples 1 and 2, which were prepared by the method of the present invention (under conditions satisfying Expression 1) and thus had crystalline grains with specific aspect ratios, exhibited improved capacity and lifetime characteristics compared to the lithium secondary batteries with the positive electrode active material precursors of Comparative Examples 3 to 5.

The invention claimed is:

1. A method of preparing a positive electrode active material precursor, comprising:
   providing a transition metal-containing solution including nickel, cobalt, and manganese; and
   introducing the transition metal-containing solution into a reactor, adding a basic aqueous solution and an ammonium cation-containing complex-forming agent, and performing a co-precipitation reaction to prepare a transition metal hydroxide in a form of a secondary particle, wherein the secondary particle is formed by agglomerating primary particles,
   wherein the co-precipitation reaction is performed under conditions satisfying the following Expression 1:

$25 < 1.8 \times X + 0.2 \times Y + 20 \times Z < 30$   [Expression 1]

in Expression 1,
   X is a ratio of a number of moles of ammonia included in the ammonium cation-containing complex-forming agent to a total number of moles of transition metals included in the transition metal-containing solution,
   Y is a value of a temperature (C°) of the co-precipitation reaction, and
   Z is a ratio of a number of moles of nickel to the total number of moles of transition metals included in the transition metal-containing solution.

2. The method of claim 1, wherein the transition metal-containing solution includes nickel at 80 mol % or more with respect to the total number of moles of transition metals.

3. The method of claim 1, wherein the ammonium cation-containing complex-forming agent is added wherein a ratio of the number of moles of ammonia included in the ammonium cation-containing complex-forming agent to the total number of moles of transition metals included in the transition metal-containing solution is 0.2 to 2.0.

4. The method of claim 1, wherein a temperature of the co-precipitation reaction is 40° C. to 60° C.

5. The method of claim 1, wherein a pH of the co-precipitation reaction is 10 to 12.

6. A positive electrode active material precursor comprising:
   a transition metal hydroxide in a form of a secondary particle, wherein the secondary particle is formed by agglomerating primary particles,
   wherein an aspect ratio of a crystalline grain of the positive electrode active material precursor, which is a ratio (a/c) of a length (a) of a major axis to a length (c) of a minor axis, is 1.5 to 6.0 as obtained by least squares approximation after applying a full width at half maximum of all of peaks exhibited in X-ray diffraction (XRD) data obtained by XRD analysis for the positive electrode active material precursor to the following Expression 3:

$$d_{(hkl)} = \frac{K\lambda}{2\cos\theta \sqrt{\left\{a \cos(\tan^{-1}\left(\frac{a}{c} \tan(\frac{\sqrt{l^2}}{\sqrt{h^2+k^2}})\right)\right\}^2 + \left\{c \sin(\tan^{-1}\left(\frac{a}{c} \tan(\frac{\sqrt{l^2}}{\sqrt{h^2+k^2}})\right)\right\}^2}}$$   [Expression 3]

in Expression 3, $d_{(hkl)}$ is the full width at half maximum of a corresponding peak, h, k, and l are Miller indices for a crystallographic plane of a corresponding peak, K is a Scherrer constant, θ is a Bragg angle, λ is an X-ray wavelength, a is the length of the major axis of a crystalline grain, and c is the length of the minor axis of a crystalline grain.

7. The positive electrode active material precursor of claim 6, wherein the aspect ratio of the crystalline grain is 3.0 to 6.0.

8. The positive electrode active material precursor of claim 6, wherein a (001) plane of the crystalline grain is oriented from a center to a surface of the secondary particle.

9. The positive electrode active material precursor of claim 6, wherein the transition metal hydroxide has an average composition represented by the following Chemical Formula 1:

$$Ni_xCo_yMn_zM1_w(OH)_2 \qquad \text{[Chemical Formula 1]}$$

wherein,

M1 includes at least one selected from the group consisting of B, Al, Zr, Y, Mo, Cr, V, W, Ta, and Nb, $0.8 \leq x \leq 1.0$, $0 \leq y \leq 0.2$, $0 \leq z \leq 0.2$, $0 \leq w \leq 0.15$, and $x+y+z+w=1$.

10. A positive electrode active material prepared using the positive electrode active material precursor of claim 6.

11. A positive electrode for a lithium secondary battery, comprising the positive electrode active material of claim 10.

12. A lithium secondary battery comprising the positive electrode of claim 11.

* * * * *